United States Patent [19]

Tanaka

[11] 4,238,776
[45] Dec. 9, 1980

[54] RECORDING DEVICE OF A TIME LAPSE MAGNETIC VIDEO RECORDER

[75] Inventor: Ryozo Tanaka, Yokohama, Japan

[73] Assignee: Kabushiki Kaisha n a c, Tokyo, Japan

[21] Appl. No.: 950,744

[22] Filed: Oct. 12, 1978

[30] Foreign Application Priority Data

Oct. 19, 1977 [JP] Japan .............................. 52-124632

[51] Int. Cl.³ ............................................. H04N 5/78
[52] U.S. Cl. ........................................ 360/10; 360/35
[58] Field of Search ................ 358/8; 360/10, 14, 35, 360/70, 77, 84, 36, 9, 11

[56] References Cited

U.S. PATENT DOCUMENTS

| 3,509,273 | 4/1970 | Kihara | 360/35 |
|---|---|---|---|
| 3,585,291 | 6/1971 | Yamakawa | 360/70 |
| 3,968,518 | 7/1976 | Kihara et al. | 360/14 |
| 4,007,490 | 2/1977 | Shoda | 360/35 X |
| 4,035,843 | 7/1977 | Tanimura | 360/35 |
| 4,143,405 | 3/1979 | Kubota | 360/10 |

Primary Examiner—Bernard Konick
Assistant Examiner—Donald E. McElheny, Jr.
Attorney, Agent, or Firm—James E. Nilles

[57] ABSTRACT

A recording device of a helical-scan type time lapse video recorder comprising a mechanism for making the phase of rotation of the rotary magnetic head and the phase of the horizontal sync signal coincide with each other, and means for allowing the recording of only the frame or field immediately after the coincidence is attained at a constant or a variable time interval. Said mechanism includes means for forcibly imparting an irregularity of rotation to said rotary magnetic head.

3 Claims, 10 Drawing Figures

RECORDING DEVICE OF A TIME LAPSE MAGNETIC VIDEO RECORDER

BACKGROUND OF THE INVENTION

1. Field of Use

The present invention relates to a recording device of a time lapse magnetic video recorder.

There is a demand for the so-called quick-motion playback of recorded images for various purposes, such as recording and observation of/phenomena which take place at an extremely slow speed and necessitate observation for various purposes. This quick-motion playback reproduces the image, which has been recorded on successive frames at an interval at several seconds to several tens of minutes, at a normal speed which is 24 frames per second in case of film and 30 frames per second in case of TV.

2. Description of the Prior Art

A practical system has been developed for this purpose in the field of film, in which the film, camera and a timer are suitably combined. The quick-playback relying upon film, however, involves various problems or shortcomings. Namely, in case of film, it is impossible to confirm the safe recording of the image soon after taking the image, because there is a time-consuming step of developing after taking the image. In addition, the film is usually so short that it contain 2,400 to 10,000 frames at most.

In order to overcome these problems, there has been proposed a system in which a TV camera, magnetic video recorder and a timer are combined. This new system conveniently allows a plyback immediately after the recording. At the same time several kinds of magnetic tapes capable of containing about 100,000 frames have been put into practical use. In this newly proposed system, however, the interval between the successive frames is about 1 second at the largest. In addition, when the image, which has been recorded at an interval of 0.5 second or larger, is reproduced at the normal speed, the quality of the reproduced image is deteriorated considerably due to a distortion of the image at the upper part of the monitor TV surface.

SUMMARY OF THE INVENTION

It is therefore an object of the invention to provide a recording device of a time lapse magnetic video recorder, capable of recording an image at an interval of several seconds to several tens of minutes, and avoiding the undesirable distortion of the image at the upper portion of the monitor surface, even when the recorded image is reproduced at the normal speed.

The above and other objects, as well as advantageous features of the invention will become clear from the following description of the preferred embodiments taken in conjunction with the accompanying drawings.

DESCRIPTION OF A PREFERRED EMBODIMENT

Figure 1:
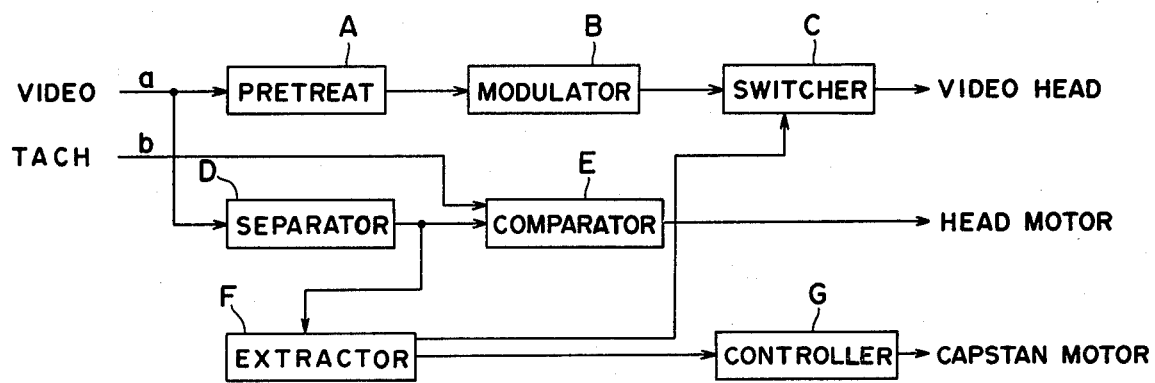
FIG. 1, including A–G, is a block diagram of a part of a conventional time lapse magnetic video recorder.

Referring first to FIG. 1 showing a block diagram of an essential part of a conventional time lapse magnetic video recorder, a process circuit A is adapted to perform a necessary pretreatment, such as reproduction of D.C. component, white compression and pre-emphasis, of the input image signal a. The image signal a is then frequency modulated into a high-frequency signal by means of a frequency modulating circuit B, and is delivered to a high-frequency switching circuit C. On the other hand, a vertical sync signal is picked out of the input image signal a, by means of a sync separation circuit D. A circuit E for sync the rotary magnetic head motor compares the phases of the vertical sync signal and a TACH signal representative of the rotational phase of the rotary magnetic head, with each other. The output of this circuit E is used for controlling the rotary magnetic head motor or the electro magnetic brake, so as to synchronize the rotation of the rotary megnetic head with the vertical sync signal.

An extracting pulse generating circuit F is adapted to generate a high frequency extracting pulse for extracting one frame from every n (n being a positive integer) successive frames. For facilitating the understanding of the invention, the description will be made hereinafter on the assumption that no interlace scanning is made. Thus, the terms "field" and "frame" have the same meaning. At the same time, it is assumed that there is equalizing pulse in the vertical sync signal. The high frequency extracting pulse is delivered to the high frequency switching circuit C, so that the signal of one frame is extracted from signals of every n frames which have been frequency-modulated by the frequency modulating circuit B, and is delivered to the rotary magnetic head, thereby recording the signal of one frame on the magnetic tape.

A capstan motor controlling circuit G is adapted to control the capstan motor such that the running speed of the tape is reduced down to 1/n of that of the normal tape running speed. Since the recording is made for one frame out of every n frames, and since the tape running speed is reduced to 1/n, a substantially equivalent recording to that of ordinary recording with the normal tape speed is attained.

Figure 2:
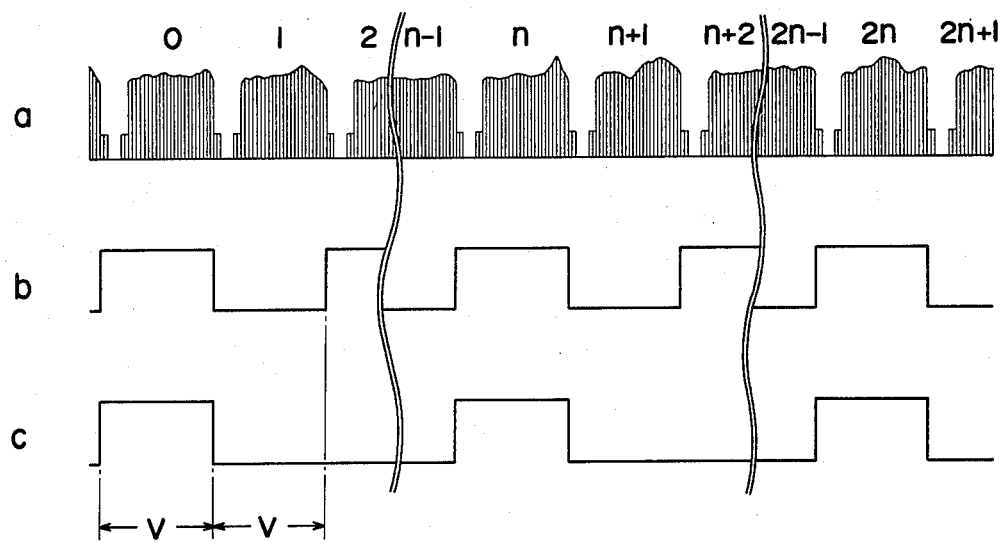
FIG. 2, including a–c, is time chart of the operation of the part as shown in FIG. 1.

FIG. 2 shows a simplified time chart for explaining the above described operation. In FIG. 2, symbols a, b and c denote the input image signal, a TACH signal representing the rotational phase of the rotary magnetic head and the high frequency extracting signal, respectively. At the same time a symbol V represents one vertical scanning period. Numerals 0, 1, 2, ... $2\eta+1$ are the number of successive frames.

In the operation of this time lapse magnetic video recorder, the vertical sync signal carried by the input image signal is in synchronization with the TACH signal representative of the rotational phase of the rotary magnetic head, as mentioned before. No problem will be caused if this synchronous operation is correctly maintained to ensure the perfect coincidence of the phases of both signals.

As a matter of fact, however, a varying phase difference is generated between both signals, due to various reasons such as influence of the change in temperature, drifting attributable to the time elapsed, change in the contact resistance or the like condition of the rotary magnetic head and the tape. The frequency component of this varying phase difference, i.e. of the irregularity of rotation of the rotary magnetic head, is a random super low frequency wave of a frequency of 0.5 Hz or lower, and the magnitude of the phase difference, i.e. the amplitude is about one horizontal scanning time in ahead and aback directions.

Figure 3:
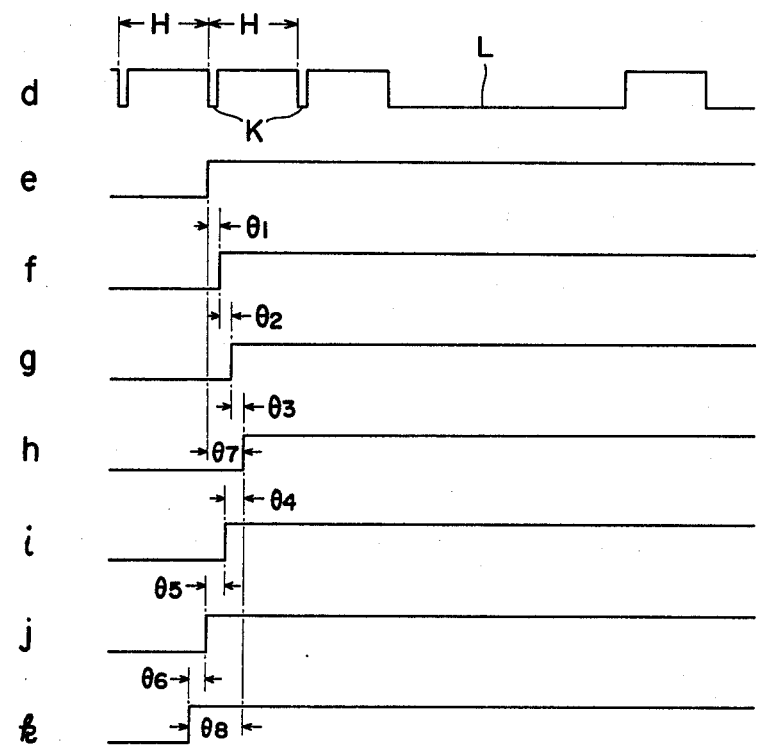
FIG. 3 is an illustration showing an example of the phase difference observed between an input image signal and a TACH signal.

Referring now to FIG. 3 showing the relationship between the phases of the input image signal and the TACH signal representing the rotational phase of the rotary magnetic head, symbols d, H, K and L represent, respectively, the sync signal of the input signal, horizontal scanning period, horizontal sync signal and a vertical sync signal. At the same time, the phases of the TACH signals corresponding to the image signals of frames O, n, 2n, ... 6n are represented by symbols e to k. Thus, FIG. 3 shows that there are phase differences $\theta_1$ to $\theta_6$ between the adjacent frames.

Supposing that the recording has been made at an interval of n frames, the phase difference $\theta_1$ to $\theta_6$ between adjacent frames will appear as the phase differences in the horizontal sync signals, when the signals are reproduced at the normal speed.

Figure 4:
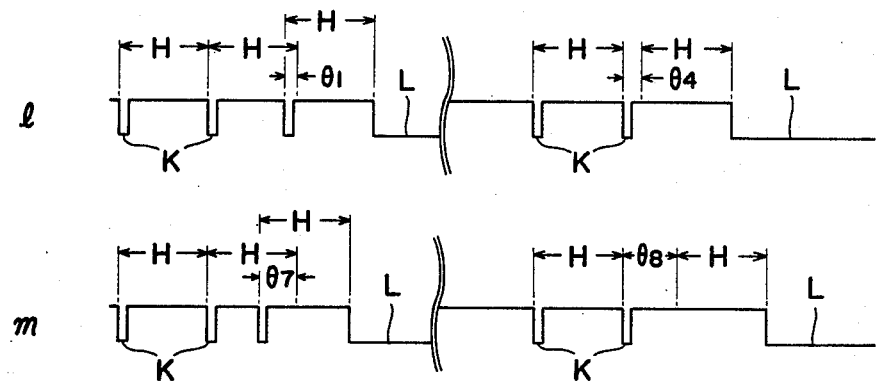
FIG. 4 is an illustration for explaining the phasic relationship between sync signals, in the recording and reproduction of image signals having a phase difference in the case of FIG. 3.
Figure 5:
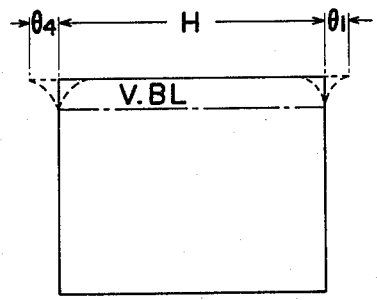
FIG. 5 is an illustration for explaining the distortion of image as observed on the monitor TV surface when the phase difference between the input image signal and the TACH signal is small.

Referring now to FIG. 4, the transient periods between the frames O and n, and the frames 3n and 4n are represented by symbols l and m, respectively. The phase differences $\theta_1$, $\theta_4$ between the frames of the horizontal sync signal are not so large as compared with one horizontal scanning period H, for the smaller number n of the frames. Although this phase differences $\theta_1$, $\theta_4$ cause a lateral distortion of the image on a monitor TV at the upper portion of the image surface, as shown in FIG. 5, due to the effect of the automatic frequency controller (AFC) of the horizontal deflecting circuit of the monitor TV, this distortion is not so serious because the phase differences $\theta_1$ and $\theta_4$ are so small as to be accomodated by the period of the vertical retrace line (V.BL).

Figure 6:
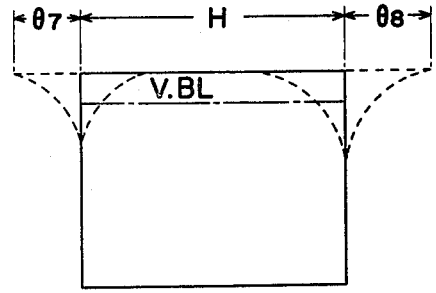
FIG. 6 is an illustration for explaining the distortion of image as observed when the phase difference is large.

However, the distortion of the reproduced image becomes more serious, when a longer interval of the recording is adopted. Namely, supposing here that the recording has been made at a longer intervals for frames 0, 3n, 6n ..., the phase differences $\theta_1$, $\theta_2$ and $\theta_3$ are accumulated to cause a large phase difference $\theta_7$ between the frames 0 and 3n . Similarly, a large phase difference $\theta_8$, which equals to the sum of the phase differences $\theta_4$, $\theta_5$ and $\theta_6$, is observed between the frames 3n and 6n. Consequently, when the recorded signals are reproduced at the normal speed, the phase difference of the horizontal sync signals of successive frames becomes as large as a half ($\frac{1}{2}$) of the horizontal scanning period. This causes a considerably large lateral distortion of the reproduced image on the monitor TV, as shown in FIG. 6, for the same reason as above, so as to seriously deteriorate the quality of the reproduced image.

It is of course possible to avoid this undesirable phenomenon by adopting a smaller time constant of the AFC of the monitor. However, such a way of solution cannot be recommended because the image tends to be distorted by the noise involved in the sync signal, when such a small time constant is adopted.

Thus, while the distortion of the reproduced image is not so serious when the recording interval is sufficiently small as compared with the period of the frequency component of the irregularity of rotation of the rotary magnetic head, however, when the recording is made at a recording interval around the period of the irregularity of rotation of the rotary magnetic head or longer, it is extremely difficult to get rid of the distortion of the image at the upper part thereof, as far as the conventional time lapse magnetic video recorder is concerned.

The interval of recording by conventional time lapse magnetic video recorders is less than about a second.

In sharp contrast to the above, according to the invention, the phase differences of the horizontal sync signals of the successive frames are made sufficiently small, so that an image free from the distortion can be obtained even if the recording has been made at a long recording interval of several tens of minutes, as will be understood from the following description.

Figure 7:
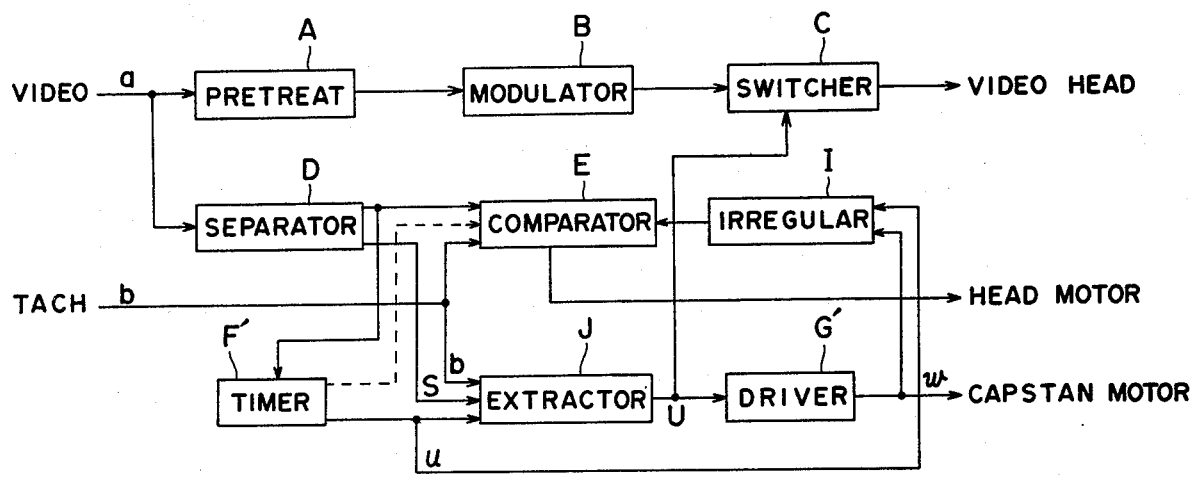
FIG. 7 is a block diagram of a time lapse magnetic recorder incorporating the recording device of the present invention.
Figure 8:
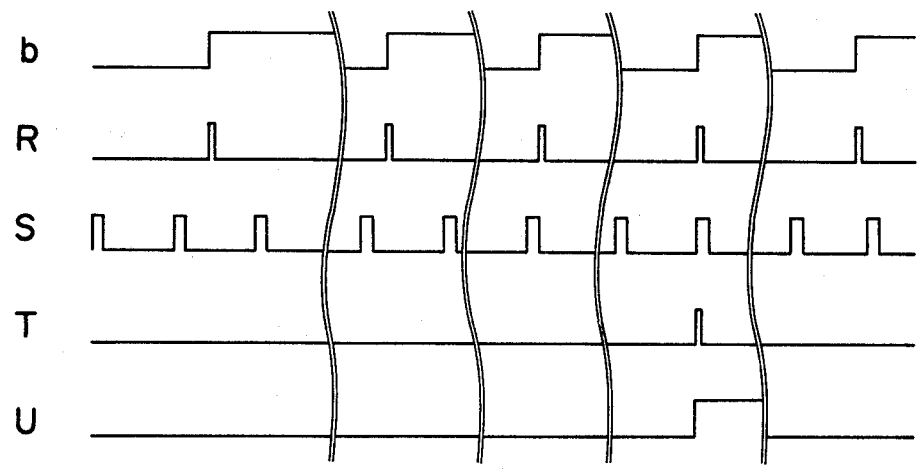
FIG. 8 is a time chart of operation of the time lapse video recorder incorporating the recording device of the present invention.
Figure 9:
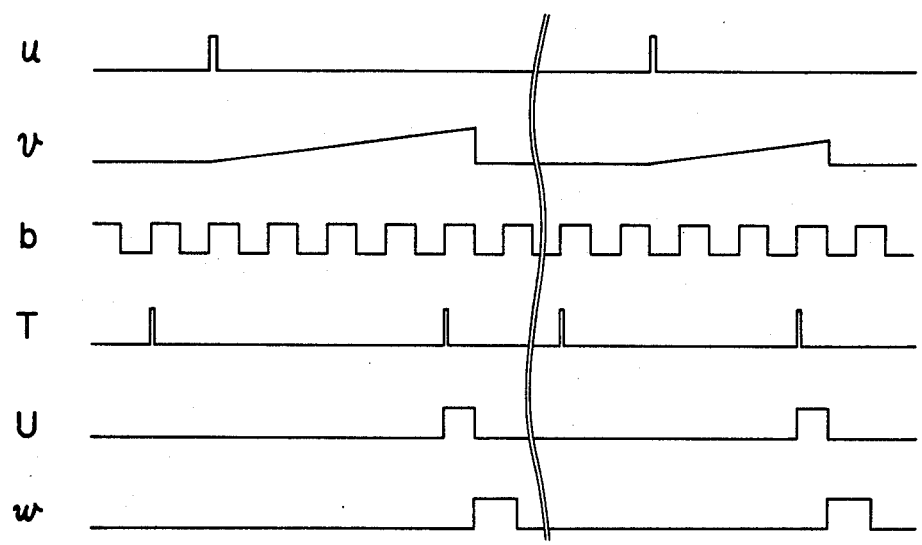
FIG. 9 is a time chart as obtained by compressing the time axis of the time chart as shown in FIG. 8.

FIG. 7 is a block diagram of an embodiment of the invention, while FIGS. 8 and 9 are time charts for explaining the operation of the same.

In FIG. 7, the same parts as those of FIG. 1 are denoted by the same symbols and the detailed description thereof are omitted here.

Figure 10:
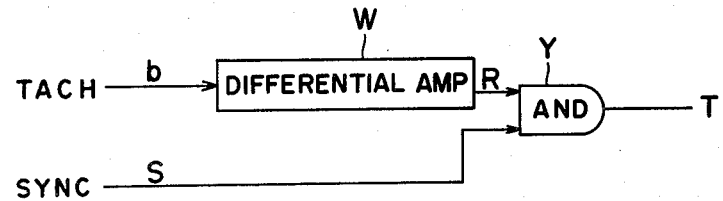
FIG. 10 is a circuit diagram of a circuit for detecting the phase of the horizontal sync signal of the image.

Referring to FIG. 7, a symbol F' denotes a timer for setting the recording interval, and is adapted to produce a recording command pulse u at a constant period. A symbol J denotes a circuit which is adapted to generate a frame-extracting pulse, upon detect of a coincidence of the TACH signal with the horizontal sync signal of the input image signal. An example of the circuit for detecting the phases is shown in FIG. 10, in which symbols b, s, W and Y denote the TACH signal, sync signal, differentiation circuit and an AND gate, respectively. Referring now to FIG. 8, the rising of the TACH signal b is differentiated by the differentiation circuit W, so that a pulse R representing the rise of the TACH signal is obtained.

The AND gate Y is adapted to produce a pulse T, as a logical product of pulse R and the sync signal S. Namely, the pulse T is generated only when the rising of the TACH signal TACH and the horizontal sync signal coincide with each other. The circuit J produces a high-frequency extracting pulse U which takes the high level only during a period of one frame immediately after the coincidence pulse T is obtained after receipt of the recording command pulse u from the timer F', delivers this pulse U to the high-frequency switching circuit C. The circuit C transmits the image signal frequency-modulated by the circuit B to the video head, only over the period in which the signal U assumes the high level, i.e. only over the period of one frame, so that the recording of one frame is made on the magnetic tape. Immediately after the recording, the circuit G' produces the signal w for driving the capstan motor by one track, so that the magnetic tape is fed by a distance corresponding to one track. This operation is continuously repeated.

Symbol I denotes an irregular rotation generating circuit adapted to put the phase of the rotary magnetic head, i.e. the phase of the TACH signal, ahead or aback by a time length corresponding approximately one horizontal scanning period, in a suitable time. This circuit I is provided for the following reason. Namely, various inconveniences such as coincidence failure of the signals b and S, or long time required for obtaining the coincidence of these signals due to the low frequency component of the irregularity of head rotation, are caused when the amplitude or amount of the irregularity is small as compared with the horizontal scanning period. As a measure for avoiding these inconveniences, an irregularity of rotation is forcibly imparted to the rotary magnetic head by means of the circuit I, so that the coincidence of the signals b and S may be obtained without fail and shortly.

In order to forcibly impart the irregularity of the rotation externally to the rotary magnetic head, in the described embodiment, a disturbance is electrically applied to the synchronizing driving system for driving the rotary magnetic head. However, this is not exclusive, and the same effect can be achieved by a mechanical means which imparts a mechanical disturbance to the tape running system. Alternatively, it is possible to make use of the irregularity of the rotation of head while the latter feeds the tape by one track, without imparting specific disturbance to the tape running system.

As a practical measure for imparting the disturbance electrically, it is possible to make use of saw-tooth wave v (See FIG. 9) which rises concurrently with the recording command u and falls in synchronization with the tape feed signal w for feeding the tape by one track. This saw-tooth wave is supplied to the synchronous driving system of the rotary magnetic head, such that the phase of the rotation of the head is put ahead by each pulse of the saw-tooth wave.

The phase shift time is preferably about 1.5 second for a shifting corresponding to one horizontal scanning. A too large phase shifting speed inconveniently makes the phase difference error of the horizontal sync signal large, so as to adversely affect the quality of the reproduced image, while a too low phase shifting speed makes the waiting time until the recording is made impractically long.

Thus, the recording is made only when the phase of the horizontal sync signal, as well as the vertical sync signal of the input image signal coincides with the phase of rotation of the rotary magnet head. Consequently, the phases of the horizontal sync signals of all tracks on the magnetic tape substantially coincide with one another, so that the adverse affect of the irregularity of rotation of the rotary magnetic head is avoided. It is therefore possible to obtain an image having no distortion at the upper part of the monitor TV surface, by the reproduction at the normal speed, even when the recording has been made at a recording interval of several seconds or longer.

In case that the recording interval is several tens seconds or longer, it is possible to suspend the driving of the rotary magnetic head over a period from an instant immediately after the completion of recording of one frame, i.e. the instant at which the pulse w in FIG. 9 falls to an instant before the recording of the next frame. This suspension of the driving of the rotary magnetic head is effective in diminishing the wear of the rotary head.

In the apparatus incorporating the recording device of the present invention, the magnetic tape is fed intermittently in the form of pulses, for the successive tracks. Thus, there is a pause before the next recording command signal is received. This means that the interval of the recording command signals, i.e. the interval of the recording of the image need not be constant. Rather, the recording interval can be changed at random, although it has to be longer than the sum of the waiting time until the horizontal sync signal comes to coincide with the TACH signal, time required for completing the recording of one frame and the time required for feeding the magnetic tape by a length corresponding to one track.

What is claimed is:

1. A recording device of a helical-scan type lapse video recorder characterized by comprising means for detecting the phase of a vertical sync signal in a video signal to be recorded, means for detecting the phase of rotation of a rotary magnetic head, a comparing circuit for comparing said phases with each other, means for controlling the rotation of said rotary magnetic head according to the output of said comparing circuit so that the phase of the vertical sync signal coincides with the phase of rotation of the rotary magnetic head, means for detecting the phase of a horizontal sync signal in the video signal to be recorded, means for detecting coincidence of said phase of the horizontal sync signal with said phase of rotation of the rotary magnetic head, means for recording at a predetermined time interval on a recording medium through said rotary magnetic head, a frame or field of said video signal immediately after said phase of the horizontal sync signal coincides with said phase of rotation of the rotary magnetic head, and means for feeding said recording medium for one track pitch after the recording of a frame or field has been completed.

2. A recording device as set forth in claim 1 further comprising means for accelerating or decelerating the rotational speed of said rotary magnetic head irregularly.

3. A recording device as set forth in claim 2, wherein said means for accelerating or decelerating the rotational speed of said rotary magnetic head includes a circuit for delivering a saw-tooth wave to a driving system for driving said rotary magnetic head, said saw-tooth wave consisting of saw-tooth pulses each of which rises concurrently with the receipt of a recording command signal and falls concurrently with the receipt of a tape feed signal.

* * * * *